Patented Aug. 6, 1946

2,405,438

UNITED STATES PATENT OFFICE 2,405,438

FIRE EXTINGUISHING COMPOSITION AND METHOD OF MAKING SAME

David Levin, Philadelphia, Pa., assignor to Chemical Concentrates Corp., Philadelphia, Pa., a corporation of Pennsylvania No Drawing. Application December 28, 1943, Serial No. 516,124

6 Claims. (Cl. 252—3)

The present invention is directed to fire-extinguishing compositions, and more particularly, to the type which provides a foam for blanketing a fire.

Considerable work along these lines has previously been done and a number of compositions for such a purpose have been proposed. Some such compositions are inorganic in nature and others are of organic origin. Among such materials it has been proposed to treat protein-containing substances in such a manner as to break down the proteins and form a water-soluble material which is adapted to provide a foam when mixed with air and water.

For instance, it has been proposed to treat a material such as soya bean meal with a caustic alkali or with a strong acid by heating the mixture at a relatively high temperature in order to degrade the protein. Because of the use of a strong alkali or acid, the digestion may cause extensive decomposition of the protein material, so that low molecular weight nitrogen compounds are formed. While these were fully soluble in water, they were capable of producing a foam of only moderate effectiveness since under the influence of the heat generated by a fire, the foam tended to disintegrate. Therefore, such compounds were generally used in conjunction with an inorganic additive agent to improve the foam, such agents being ferrous sulphate, or aluminum acetate, or silicate of soda, and the like.

In accordance with another process, such substances as soya bean meal were treated with a relatively large amount of lime and a water-soluble salt, by heating the composition mixed with water for a relatively long time to cause a reaction to take place to degrade the protein. The purpose of the treatment was to decompose as completely as possible the protein material, and to obtain a maximum of peptones. In the final product 50–60% of the nitrogen was in the form of peptones. This process resulted in such a degeneration of the protein that the foam produced thereby was relatively unstable and did not have the desirable properties necessary for a fire-extinguishing composition. The treatment of the meal was rather unsatisfactory, in that during the process gummy substances were formed which necessitated the use of additional amounts of reagents and decreased the amount of water-soluble protein obtained in the process. Such gum formation also interfered with the processing, and particularly the filtration to remove insoluble matter from the degraded proteins.

The present invention is intended and adapted to overcome the disadvantages and difficulties inherent in prior art processes and to provide a method of treating certain protein-containing materials to degrade the same to a desired point with certainty and effectiveness.

It is also among the objects of the present invention to provide a product in which the proteins have been degraded only to the point where they are water-soluble, while retaining therein a sufficiently high molecular weight so that upon being subjected by heat to a fire the foam containing the same will become hardened and toughened and thus become more effective.

In practicing the present invention I provide a material taken from the class consisting of cottonseed cake and peanut cake, from which the oils have been substantially removed. Some oil may remain, as a small amount thereof does not interfere with the present process. Other cakes or meals obtained from seeds which are commonly available have proven unsatisfactory, and the present invention is directed to the use of cottonseed and peanut products only.

The starting material is mixed with a relatively small amount of lime, without any further additions of salts such as had been used previously. It is mixed with a relatively large amount of water, and the mass is heated approximately to the boiling point for about two hours. In this time, the digestion has gone to a point where the proteins have been partially degraded, but the degradation is to such an extent that not over about 20% of the nitrogen is in the form of peptones. The remainder of the nitrogen is in the form of proteoses. Because of this, there is obtained a more uniform range of nitrogen compounds than was obtained in the prior art. Also, the nitrogen compounds have a relatively high molecular weight. This has a very important advantage, in that when a foam is produced with such compounds and the foam is spread on a fire, the high temperature tends to coagulate the nitrogen compounds and thus fix the foam in a tough film. This insures blanketing the fire under all circumstances. At the same time, the degradation has gone to a sufficient extent so that the water-soluble nitrogen compounds are not precipitated by moderately strong solutions of inorganic salts. This is of considerable advantage, in that it allows the use of the present composition with salt or fresh water with equally good effects.

Because of the use of the specific raw material and the character of the method of treatment, the present products are capable of being sprayed through ordinary nozzles without difficulty. Since no gums are formed in the process and the solution is substantially free therefrom, nozzles do not become clogged with use. This is contrary to experience with prior art compositions.

The following is a specific example of the operation of the present invention:

A mixture is made of the following constituents:

Cottonseed or peanut cake_____pounds__ 100
Hydrated lime _____do____ 15
Water _____gallons__ 50

The cake may be broken up or may be in the form of a meal, and usually it contains from 40–45% of protein substances. The mixture is raised to a temperature of about 95° C. and is held there for approximately two hours. During this period the digestion takes place, with the breaking down of the proteins to the desired point. At the end of the digestion, the solution is filtered while still hot to remove the fibrous and other insoluble matter and any excess of lime which may be present. The solution is neutralized with a suitable acid, forming a small amount of a salt in the solution. The solution is then evaporated to a point where the specific gravity is 1.12–1.18 and contains approximately 30–45% of solids. In some instances, it may be desirable to evaporate the solution to dryness and form a powder which may be used in combination with sodium bicarbonate and aluminum sulphate to form chemical foam.

The compositions described above may be used as such by dilution with water and atomizing with air or other gas to form a fire-blanketing or extinguishing foam. It is also possible to use the composition together with other fire-extinguishing or foaming substances, either inorganic or organic in nature. For instance, one may add to the composition a ferrous salt, such as ferrous sulphate, in relatively small amount, say, 1–3% of the solution, whereby a still denser foam is produced.

In the above specific example certain proportions of constituents and conditions of treatment were set forth. These may be varied, to some extent, within the spirit of the invention. For instance, the hydrated lime may range from 10 or more pounds. The amount of water added may be from 40–55 gallons. The temperature may be between 90 and 100° C., and the digestion may take place from 1¾–2½ hours. If one somewhat increases the temperature of treatment, then the time is correspondingly reduced, and vice versa. It has been found essential, in the present invention, that the alkaline material in strength and amount must be correlated with the amount of water present, and the temperature and time of treatment. If one factor is varied to some extent, then another factor must be varied in order to compensate for the same. The essence of the invention is the degradation of the protein to the extent that most of it is in the form of proteoses and not over about 20% thereof is in the form of peptones.

There are other advantages inherent in the present invention, in that the material has properties which may be considered ideal for fighting of fire. It produces a dense foam which adheres to the surface upon which it is sprayed with considerable tenacity, and the foam is of rather permanent character. The raw materials used are available in large quantities at a low cost, and the processing thereof may be conducted with the use of a minimum of chemical materials. The amount of effective product obtained by the product is relatively large. It is suitable for use with fresh, hard or salt water and is compatible with relatively large quantities of chlorides, of calcium and magnesium, to produce a composition having a low freezing point.

Although the invention has been described with the use of a single specific example of the operation thereof, it will be understood that the invention is not limited to such specific example, which was given for purposes of illustration. Various changes in the materials used, the conditions of treatment and other factors may be made within the spirit of the invention, the scope of which is not to be limited except by the claims appended hereto.

What I claim is:

1. The process of producing a fire-extinguishing composition which comprises mixing a substance taken from the class consisting of cottonseed and peanut cakes with hydrated lime in the ratio of about 100 to 15, adding a relatively large amount of water thereto, heating the same at a temperature of about 95° C. for about two hours, until the proteins have been converted to proteoses and peptones, filtering off the insoluble material, the amount of peptones being not over about 20% of the nitrogen compounds present, said proteoses being capable of becoming hardened and toughened when subjected to high temperatures.

2. The process of producing a fire-extinguishing composition which comprises mixing a substance taken from the class consisting of cottonseed and peanut cakes with hydrated lime in the ratio of about 100 to 15, adding a relatively large amount of water thereto, heating the same at a temperature of about 95° C. for about two hours, until the proteins have been converted to proteoses and peptones, filtering off the insoluble material, neutralizing the soluble hydrated lime in the filtrate, the amount of peptones being not over about 20% of the nitrogen compounds present, said proteoses being capable of becoming hardened and toughened when subjected to high temperatures.

3. The process of producing a fire-extinguishing composition which comprises mixing a substance taken from the class consisting of cottonseed and peanut cakes with hydrated lime in the ratio of about 100 to 15, adding a relatively large amount of water thereto, heating the same at a temperature of about 95° C. for about two hours, until the proteins have been converted to proteoses and peptones, filtering off the insoluble material, concentrating the filtrate until the solid content thereof is about 30–35%, the amount of peptones being not over about 20% of the nitrogen compounds present, said proteoses being capable of becoming hardened and toughened when subjected to high temperatures.

4. A composition for use in fire extinguishing consisting essentially of a protein obtained from a substance taken from the class consisting of cottonseed and peanut cakes, produced by heating said cake with about 15% of hydrated lime for about 2 hours at about 95° C. and filtering off the insoluble matter, and consisting principally of proteoses and peptones, the amount of peptones being not over about 20% of the nitrogen compounds present, said proteoses being capable of becoming hardened and toughened when subjected to high temperatures, said composition containing a relatively large amount of water.

5. A composition for use in fire extinguishing consisting essentially of a protein obtained from a substance taken from the class consisting of cottonseed and peanut cakes, produced by heating said cake with about 15% of hydrated lime for about 2 hours at about 95° C. and filtering off the insoluble matter, and consisting principally of proteoses and peptones, the amount of peptones being not over about 20% of the nitrogen compounds present, said proteoses being capable of becoming hardened and toughened when subjected to high temperatures, and containing a small proportion of a ferrous salt, said composition containing a relatively large amount of water.

6. A composition for use in fire extinguishing consisting essentially of a protein obtained from a substance taken from the class consisting of cottonseed and peanut cakes, produced by heating said cake with about 15% of hydrated lime for about 2 hours at about 95° C. and filtering off the insoluble matter, and consisting principally of proteoses and peptones, the amount of peptones being not over about 20% of the nitrogen compounds present, said proteoses being capable of becoming hardened and toughened when subjected to high temperatures, said proteins being in solution in water to the extent of about 30–35% solids, said composition containing a relatively large amount of water.

DAVID LEVIN.